May 25, 1954   F. M. POTTER   2,679,607
POLE PIECE FOR DYNAMOELECTRIC MACHINES
Filed Oct. 12, 1951

SHADED AREA
COPPER PLATED

SHADED AREA
COPPER PLATED

INVENTOR.
FREDERICK M. POTTER
BY
*James M. Mickels*
ATTORNEY

Patented May 25, 1954

2,679,607

UNITED STATES PATENT OFFICE 2,679,607

POLE PIECE FOR DYNAMOELECTRIC MACHINES

Frederick M. Potter, Westwood, N. J., assignor to Bendix Aviation Corporation, Teterboro, N. J., a corporation of Delaware Application October 12, 1951, Serial No. 251,120

1 Claim. (Cl. 310—218)

This invention relates to dynamoelectric machines and more particularly to the pole construction of a dynamoelectric machine.

It has been more or less common practice to provide dynamoelectric machines with compensating windings in order to compensate for the armature reaction in such machines. The compensating windings are usually disposed in slots in, or adjacent to, the faces of the pole pieces. In order to assemble the windings in the slots, it has been necessary to insert the conductors individually and then solder or fasten them together. The size of the opening of the slots being such as would not permit the windings to be preformed and inserted.

The present invention provides a pole assembly having a portion readily removable to permit the insertion of preformed coils.

An object of the invention is to provide an improved pole assembly for a dynamoelectric machine.

Another object of the invention is to provide an improved laminated pole piece.

Another object of the invention is to provide an improved magnetizable structure for electrical purposes.

Another object of the invention is to provide an improved method of constructing a pole piece for a dynamoelectric machine.

Another object of the invention is to provide an improved method of making a laminated structure for electrical purposes.

The above and other objects and features of the invention will appear more fully hereinafter from a consideration of the following description taken in connection with the accompanying drawing wherein one embodiment of the invention is illustrated by way of example.

Figure 1:
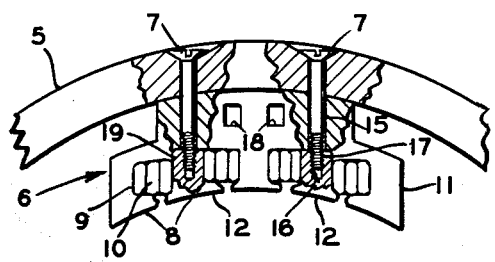
Figure 1 is a partial cutaway view of a section of a dynamoelectric machine having a pole piece mounted thereon.

Referring now to the drawing, wherein only a section of a dynamoelectric machine having a pole piece secured thereto is illustrated. It is understood, however, that the machine may have a plurality of poles, only one being shown for simplicity.

A yoke 5 of a dynamoelectric machine has main poles 6 mounted along the inner periphery thereof and held in place by bolts 7. The poles 6 are provided with pole faces 8 adjacent the rotatable armature (not shown) and openings 9 for receiving compensating windings 10. The main field winding (not shown) is carried by the poles 6.

The pole 6, when installed in the machine, is made up of a main section 11 and two toothed sections 12.

Figure 2:
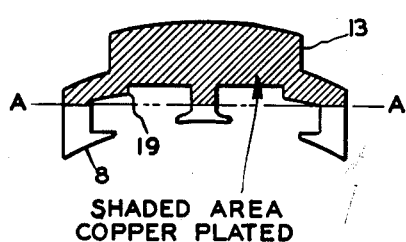
Figure 2 is a front view of one of the pole laminations.
Figure 3:
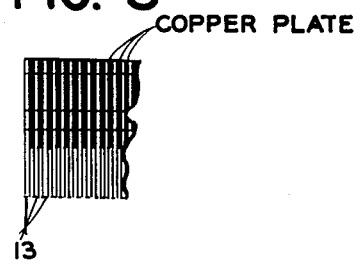
Figure 3 is an end view showing the assembly of the laminations.
Figure 4:
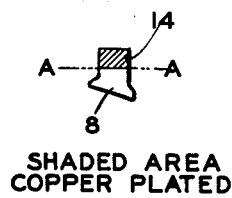
Figure 4 is a front view of a tooth lamination.

The section 11 is made of a stack of laminations 13 (see Figure 2) and the sections 12 are made of a stack of laminations 14 (see Figure 4). The laminations 13 and 14 may be of any suitable ferromagnetic material. In the assembly of the section 11, the laminations 13 are copper-plated from the top down to approximately the line A—A. The individual laminations 13 are then assembled in a proper fixture (not shown) under pressure, and then brazing the copper-plated surfaces together by induction heating (see Figure 3). After brazing, clearance holes 15 for the bolts 7 are drilled in the member 11.

The sections 12 are made up in the same manner by copper-plating the laminations 14 down to approximately the line A—A and brazing the laminations 14 together. After brazing, the sections 12 are provided with a tapped hole 16 having threads adapted to cooperate with a threaded portion 17 of bolts 7.

The sections 11 may have holes 18 therein in order to reduce the weight of the structure.

In assembling the structure, the windings 10 are placed in the slots 9 of the section 11. The section 12 is then placed in position and the pole 6 placed in position on the yoke 5. The bolts 7 coact with the threads in the section 12 and pull the combination pole piece into its desired position. A shoulder 19 in the slots 9 prevents the section 12 from turning while the bolts 7 are being tightened.

Thus, by brazing the laminations together, it is possible to drill and tap the assembly which in some applications would be too narrow to be riveted and then drilled. Yet a laminated structure is provided adjacent the pole faces. The unplated portions of the laminations will have sufficient oxide thereon to form an insulating barrier between that portion of the laminations.

Although only one embodiment of the invention has been illustrated and described, various changes in the form and relative arrangement of the parts, which will now appear to those skilled in the art, may be made without departing from the scope of the invention.

What is claimed is:

A pole structure for use in a dynamoelectric machine having a compensating winding, comprising a plurality of pole assembly laminations having a pole face portion and openings therein for said compensating windings, said pole assembly laminations having a portion thereof away from said pole face portion brazed together to form a unitary structure, a plurality of tooth assembly laminations having a pole face portion, said tooth assembly laminations having a portion thereof away from said pole face portion brazed together to form a unitary structure, and means including a threaded portion in the brazed section of said tooth assembly laminations for securing said tooth assembly laminations to said pole assembly laminations.

References Cited in the file of this patent

UNITED STATES PATENTS

| Number | Name | Date |
| --- | --- | --- |
| 969,608 | Davis | Sept. 6, 1910 |
| 1,005,858 | Lord | Oct. 17, 1911 |
| 1,929,787 | Mudge | Oct. 10, 1933 |
| 2,236,291 | Kilbourne | Mar. 25, 1941 |
| 2,286,008 | Pfalzgraff | June 9, 1942 |
| 2,475,535 | Wellbaecher | July 5, 1949 |
| 2,479,325 | Domenico | Aug. 16, 1949 |
| 2,512,351 | Lynn | June 20, 1950 |

FOREIGN PATENTS

| Number | Country | Date |
| --- | --- | --- |
| 559,526 | Great Britain | Feb. 23, 1944 |